(12) United States Patent
Pettinos

(10) Patent No.: X5390
(45) Date of Patent: Mar. 3, 1829

(54) REEDING, & FLUTING, STRAIGHT & SPIRAL

(76) Inventor: Peter Pettinos

Peter Pettinos of Philadelphia Pennsylvania—

Letters Patent

The schedule referred to in these letters Patent and making part of the same containing a description in the words of the said Peter Pettinos himself of his improvement called the Cromamometro.

To all persons to whom these presents shall come,
Be it known that I Peter Pettinos of the City of Philadelphia in the State of Pennsylvania, have invented a new and useful improvement in the cromamometro, or instrument for tuning Piano Fortes and other musical instruments, the following is a full and exact description of the construction and operation of the said Machine, or instrument as invented & improved by me & an explanation of the drawing of the same hereto annexed No. 1 A solid brass head in the shape of a flat knob with a screw which enters in a brass moveable Oblong square block, (No. 2) and to which the top spring is affixed and by screwing or unscrewing the abovementioned brass head the Cromamometro, may be brought to the exact temperature of the instrument intended to be tuned.

No. 3, Is a sliding bridge on which is a brass key No. 4 under which a spring is placed & which terminates in the shape of a hook, which articulates the said bridge at pleasure (by pressing slightly on the spring) into the different degrees of the brass scale.

No. 5. Is a brass scale fixed with brass screws on the handle.

No. 6. The handle. This is seventeen inches and an half in length, one inch & an half, in width seven eighths of an inch in thickness the upper extremity of which handle expands about half an inch in front the which No. 2 acts, No. 7 the body, this is fifteen inches and seven eighths of an inch long, five inches and a quarter wide & two inches deep—

No. 8. The sounding board on the lower part of which is a pin to which the string is affixed No. 9. No. 10 The permanent bridge over which the string is distended. No. 11. A square perforation thro' which the ham-
-mer strikes the string in the same manner as an upright Piano Forte with,
this difference, that the action of the latter is generally placed outside and the
former inside of the body of the Cromanometro
No. 12. The key of the instrument by touching which the hammer acts, at
once upon the string producing the proper tone by which we are to be guided
in the tuning of instruments. ——

What I claim as new and as my own invention or discovery in the
above described machine or instrument & for which I ask an exclusive
privilege, is what is described in the foregoing Specification, as No. 1 viz.
a solid brass head in the shape of a flat knob which enters in a brass
moveable oblong square block, to which the string is affixed & by screwing
or unscrewing which, the Cromamometro may be brought to the exact tem-
perature of the instrument intended to be tuned.

The utility of this improvement consists in the facility ease &
correctness by which a single individual may tune a Piano or other in-
-strument. The cromamometro is placed on the Piano, & with one hand
the person strikes simultaneously the key of the Cromamometro, & the
Piano at the same time regulating the tone by means of the screw, or knob at
the top until the proper temperature is ascertained, the moveable bridge is
then moved along the scale to each note in succession giving its proper tone
without any further alteration of the string, when this is performed it
remains only to tune the remaining keys by octaves, by the old in-
strument one individual could not strike the Piano & Cromamo
metro, at the same time he regulated the tone of the latter, thus
the simultaneous tones of both could not be so easily ascertained.

Witnesses
Jno. R. Dodges }
Archd. Randall, }

Peter Pellinos

Ent.
Chf. W.

770